Feb. 18, 1941.                S. S. CRAIG                2,232,315
                        CUTTING AND SHEARING TOOL
                          Filed March 19, 1940
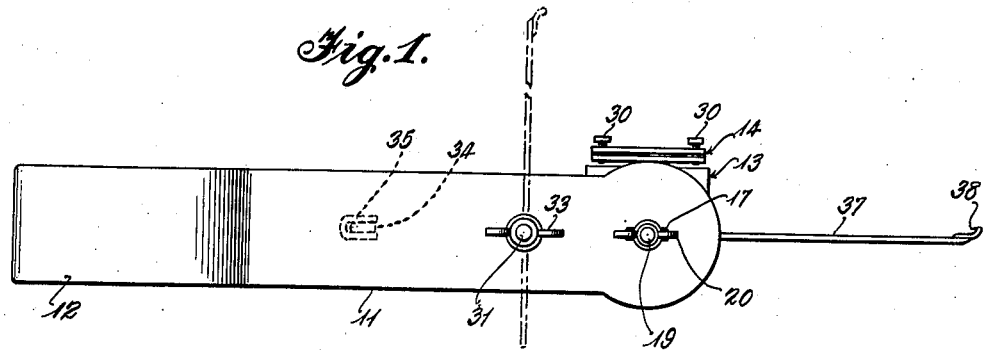
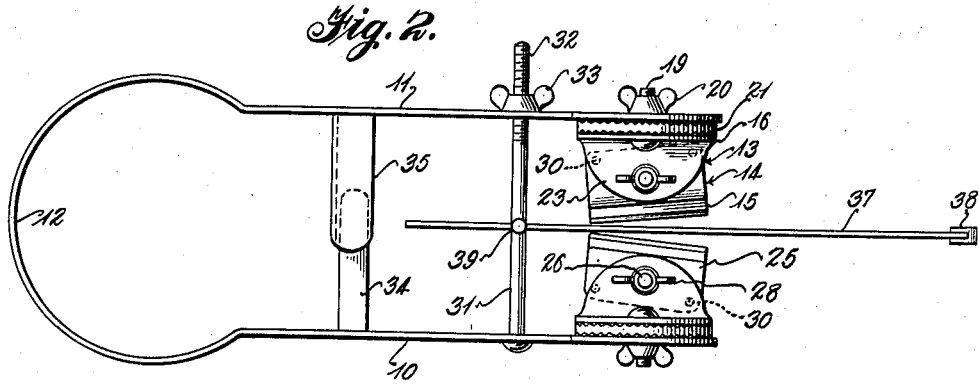
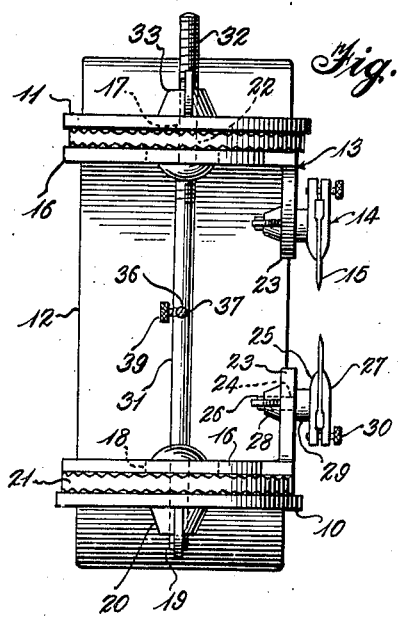
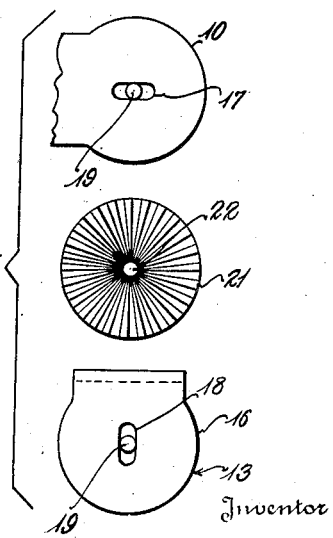
Inventor
Samuel Sharpe Craig
By Stevens and Davis
Attorneys Patented Feb. 18, 1941

2,232,315

UNITED STATES PATENT OFFICE 2,232,315

CUTTING AND SHEARING TOOL

Samuel Sharpe Craig, Newtown Square, Pa.

Application March 19, 1940, Serial No. 324,896

7 Claims. (Cl. 30—236)

This invention relates to cutlery and more particularly to a tool adapted to perform either shearing or cutting operations by the employment of a single set of cooperating blades.

While cutting tools of various types, adaptable for the performance of a wide variety of operations, are on the market today, there is no known cutting tool, the edges of which are adaptable for shearing as well as cutting. It has heretofore been deemed inexpedient to employ a single tool with a single set of cooperating blades for both cutting and shearing, because of the fact that cutting edges are ordinarily bevel ground or hollow ground to permit a wedge action in cutting while shearing edges are normally ground to define a more or less right angle, two edges cooperating to effect a shear.

Because of the fact that cutting edges have not been considered suitable for shearing operations, the extensive development involving various types of blade holders for the use of discarded razor blades has been limited almost exclusively to the production of additional cutting tools such as paint scrapers, sickles, scythes, etc., while the use of such blades for shearing operations has not been thought feasible.

Furthermore, shears as now known generally have the cooperating blades or edges in a fixed position quite suitable for one particular type of shear cut, such as nipping, but not readily adaptable to the production of different types of shearing actions requiring alterations in the position of the blades to maintain efficiency regardless of the location and character of the material being severed.

It is an object of this invention to provide a tool consisting of cooperating blade holders by the use of which discarded razor blades or other beveled ground cutting edges may be employed with equal facility for both shearing and cutting operations, thereby enormously increasing the field of use for discarded razor blades.

Furthermore, the present invention contemplates the mounting of cutting edges in such a way that shearing and nipping operations may be performed by a simple adjustment of a single tool, while by further adjustment of the tool cutting operations such as ripping and scraping may be performed.

By the employment of the present invention, either cutting or shearing operations may be performed in cooperation with means for guiding the cutting edges, while such means are so positioned and arranged as to avoid the slightest interference with either type of operation. This invention now makes it possible to begin a cutting operation by the use of a shearing action which may be followed by a cutting action without any adjustment whatsoever of the tool employed.

According to the present invention, the blades are mounted in holders from which they may be easily removed for either replacement or sharpening, thus permiting the use of discarded razor blades. Thus in the trimming of shrubbery, neat, sharp shearing is possible so that wounds to the vegetation may heal more readily while the pruning operations, from the standpoint of the operator, are more easily performed.

It is further within the contemplation of the present invention to provide a superior shearing tool, the edges of which may be readily adjusted into various working positions thereby contributing to the efficiency of the tool and the convenience of the operator.

Other objects and advantages of this invention will be apparent from a consideration of the following detailed description of a preferred embodiment thereof when taken in conjunction with the annexed drawing wherein:

Figure 1 is a view in side elevation of the device showing the cutting edges operating in a plane parallel to the longitudinal axis of the holders;

Figure 2 is a plan view of the device in the adjusted position employed for combined shearing and ripping;

Figure 3 is a slightly enlarged end view of the device showing the blades in the position of Figure 2; and Figure 4 is a detail view showing the pin slots in a support arm, a friction disc, and an L-piece.

Referring in further detail to the drawing, the tool comprises support members 10 and 11 which extend from a spring pivot 12 in the manner of conventional grass shears, and L-piece 13 attached to each support member, and a blade holder 14 and blade 15 connected to respective L-pieces.

While two L-pieces are used, the L-piece adjacent support member 11 is affixed thereto in the same manner as that which is attached to support member 10, so that a description of the manner of affixation of the latter will apply with equal force to both.

It will be noted upon reference to Figure 4, that support member 10 and a shank 16 of L-piece 13 are provided with cooperating apertures 17 and 18 respectively. Aperture 17 is elongated in the direction of the longitudinal axis of member 10 while aperture 18 is elongated in the direction of the longitudinal axis of shank 16. When the tool is assembled these apertures are placed in alignment and a threaded bolt 19 is passed therethrough while thumb nut 20 is tightened to lock the shank 16 and arm 10 against relative movement about bolt 19 as an axis.

Since L-piece 13 is attached to support member 10 and since it also has attached thereto blade 15, it is important that means be provided for holding L-piece 13 in any adjusted position with regard to support member 10. Consequently, it is desirable that the end of support member 10 and the shank 16 of L-piece 13 be rounded and slightly enlarged so as to present a large friction area. The disposition of a radially scored friction disc 21 between shank 16 and support member 10 further assists in frictionally locking said pieces against relative movement when nut 20 is tightened. As shown in Figure 4, friction disc 21 is drilled at 22 to receive stud 19.

A blade holder 14 is attached to shank 23 of each L-piece 13 which shank is drilled at 24 for the reception of a stud and is rounded so as not to interfere with the cutting edge of blade 15 when it is clamped in holder 14. The blade holders 14 each consist of a member 25 having a stud 26 extending therefrom and a cooperating member 27 adapted to overlie member 25 to clamp blade 15 therebetween. In attaching the blade holder 14 to shank 23, stud 26 is passed through aperture 24 and a thumb nut 28 is attached to hold the parts against pivotal movement about stud 26 as an axis. As illustrated in Figure 3 a washer or bushing 29 may be interposed between member 25 and shank 23, although if desired member 25 may rest directly against the surface of shank 23.

Members 25 and 27, which constitute blade holder 14, are each provided with a longitudinal groove to constitute a receiving recess for a razor blade backing in the event it is desired to use a razor blade of that type. If a double edge blade is employed screws 30, which are employed in holding together members 25 and 27 to frictionally grip a blade therebetween, may function to prevent the blade from being thrust too far into the holder so that the cutting edge is no longer exposed. In the preferred form shown, screws 30 are seated in member 25 for rotation while they are threaded to cooperate with threaded apertures in member 27 to draw the latter against member 25 upon turning the screws 30.

Supporting arms 10 and 11 are provided with aligned apertures somewhat nearer pivot 12 than the blades and a bolt 31 is passed through these apertures. Bolt 31 has a threaded shank 32 on which a thumb nut 33 is mounted so that the arms 10 and 11 may be held against movement apart in any desired position. This bolt will also function to a certain extent in keeping the arms 10 and 11 in the same plane as they are moved about spring pivot 12. However, due to the fact that a very accurate adjustment of the blades is necessary in performing shearing operations a tongue 34 extends from support member 10 and is received in a housing 35 U in cross-section in aligned position extending from member 11. This arrangement will keep the two members 10 and 11 in exactly the same plane during shearing operations even when heavy materials are being severed.

Bolt 31 is centrally drilled at 36 and extending through the opening is a graduated guide rule 37 having a line follower 38 thereon. A set screw 39 is threaded into bolt 31 so as to cooperate with rule 37 in its passage through aperture 36. By the use of screw 39 follower 38 may be frictionally locked at any given distance from bolt 31 and consequently from blades 15. Additionally guide 37 may take a wide variety of radial positions as regards bolt 31, for example see Figure 1 both the full and broken lines.

When the preferred form of this invention as described above and as illustrated in the annexed drawing is to be used, the operator first determines the plane in which he wishes blades 15 to lie. Thereafter thumb nuts 20 are loosened and the blade holders 14 with the blades 15 therein are adjusted to any desired position generally tangent to the rounded portions of supporting members 10 and 11 by mere pivotal movement of L-pieces 13. In the event a shearing operation is to be performed an additional adjustment will be necessary as regards one of the L-pieces 13. This latter adjustment involves the use of slot 18 whereby one L-piece 13 and its accompanying blade 15 may be adjusted to lie in a plane parallel to the plane of the cooperating blade but slightly offset with respect thereto so that the beveled edges of the two blades may cooperate in producing a shear cut. (See Figure 3.) When these two adjustments are complete thumb nut 20 is tightened to frictionally lock each shank 16 and friction disc 21 against rotation with regard to its respective support member.

During the foregoing adjustment the edges of the blades are presumably parallel as well as the blade bodies lying in parallel planes. Under some conditions adjustment of the angle defined between the two blades when they are drawn together may be desirable. To perform this adjustment thumb nuts 28 are loosened and the blade holders 14 are pivotally moved about their respective studs 26 until the desired blade positions are reached. Thereafter nuts 28 are tightened.

One example of the many possible uses of the invention is to be found in Figure 2 wherein the blades are set for a shear cut but are locked against movement apart by bolt and nut connection 31—33. The angular position of the blade edges with respect to each other is such that in cutting material such as rubber sheeting an initial or starting cut may be made by a shearing action while thereafter ripping may be effected by merely pushing the device toward the material with follower 38 contacting the line along which the cut is to be made to guide the operator.

If a draw cut is desired the edges of the blades may be set close together at their outer rather than their inner ends while the blade assembly as a whole may be offset from the handles by the use of the elongated apertures 17 and 18. The tool is then used by being drawn toward the operator.

It should be borne in mind that the foregoing description is merely exemplary and that many modifications of the device may be made within the scope and spirit of the appended claims. For example, the pivot 12 may be in the form of a hinge while the spring action is attainable by the use of a coil spring positioned between members 10 and 11. While single cooperating blades have been shown it will be recognized that the employment of a plurality of such blades is within the scope of this invention.

What is claimed is:

1. A cutting tool comprising, pivotally mounted support members, an L-piece pivotally attached to each member with the free ends of the L's facing, blades, a support for each blade, means pivotally connecting a support to respective free ends of L-pieces, and means for locking the pivoted parts against pivotal movement.

2. A combined cutting and shearing device comprising, pivotally mounted support members, an L-piece pivotally attached to each member with the free ends of the L's facing, razor blades, a support for each razor blade, means pivotally connecting a support to respective free ends of L-pieces, means for locking said pivoted parts against pivotal movement, and means for adjusting the position of a blade and support with respect to the axis of pivotal movement of said support.

3. A combined cutting and shearing device comprising, pivotally mounted support members, an L-piece pivotally attached to each member with the free ends of the L's facing, razor blades, a support for each razor blade, means pivotally connecting a support to respective free ends of the L-pieces, means for locking said pivoted parts against pivotal movement, means associated with said support members for holding said blades against movement apart and means connected to said last-named means adapted to act as a guide during ripping operation, said guide means and the means to which it is attached lying in the same plane as the point of pivot of said support members and their respective L-pieces.

4. A cutting device comprising, pivotally mounted support members, a secondary support pivotally attached to each member, means defining an axis of pivotal movement, blades pivotally attached to said secondary support, and means defining an axis of pivotal movement as regards said blades and said secondary supports, said first and second-named axes being at right angles to each other.

5. A device according to claim 4 and including means for adjusting the position of the blade with respect to the axis of pivotal movement of a support member and a secondary support member.

6. A combined cutting and shearing tool comprising, pivotally mounted support members, razor blades extending from said support members with their edges facing, and means for adjusting one of the blades to lie in a plane parallel to but slightly offset with respect to another, whereby a shearing action may be had by the use of beveled edge razor blades.

7. A combined cutting and shearing tool comprising, pivotally mounted support members, means to maintain the support members in the same plane when they are pivotally moved in a shearing operation, razor blades extending from said support members with their edges facing, and means for adjusting one of the blades to lie in a plane parallel to but slightly offset with respect to another, whereby a shearing action may be had by the use of beveled edge razor blades.

SAMUEL SHARPE CRAIG.